(12) United States Patent
Harm et al.

(10) Patent No.: US 7,958,090 B2
(45) Date of Patent: Jun. 7, 2011

(54) METHOD, SYSTEM, AND COMPUTER PROGRAM PRODUCT FOR IMPLEMENTING BACK UP HISTORY CLEANUP OPERATIONS FOR A DATABASE MANAGEMENT SYSTEM

(75) Inventors: Oliver Harm, Stuttgart (DE); Dirk Nakott, Stuttgart (DE); Gunter Schoellmann, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/201,189

(22) Filed: Aug. 29, 2008

(65) Prior Publication Data

US 2010/0057788 A1    Mar. 4, 2010

(51) Int. Cl.
*G06F 17/30* (2006.01)
(52) U.S. Cl. ........................................ 707/640
(58) Field of Classification Search .................. 707/640
See application file for complete search history.

(56) References Cited

U.S. PATENT DOCUMENTS

| 5,559,548 | A | * | 9/1996 | Davis et al. | 725/40 |
|---|---|---|---|---|---|
| 6,014,651 | A | * | 1/2000 | Crawford | 705/400 |
| 6,675,177 | B1 | * | 1/2004 | Webb | 1/1 |
| 6,978,282 | B1 | * | 12/2005 | Dings et al. | 707/610 |
| 7,100,072 | B2 | * | 8/2006 | Galipeau et al. | 714/6 |
| 7,165,154 | B2 | * | 1/2007 | Coombs et al. | 711/162 |
| 7,509,307 | B2 | * | 3/2009 | Biswal et al. | 1/1 |
| 7,730,032 | B2 | * | 6/2010 | Idicula et al. | 707/638 |
| 2002/0059505 | A1 | * | 5/2002 | St. Pierre et al. | 711/162 |
| 2006/0161530 | A1 | * | 7/2006 | Biswal et al. | 707/3 |
| 2008/0208929 | A1 | * | 8/2008 | Phillipi | 707/204 |
| 2008/0306907 | A1 | * | 12/2008 | Biswal et al. | 707/2 |
| 2009/0292889 | A1 | * | 11/2009 | Durfee | 711/162 |

* cited by examiner

*Primary Examiner* — Sheree N Brown
(74) *Attorney, Agent, or Firm* — Cantor Colburn LLP; Elissa Wang

(57) ABSTRACT

A method, system, and computer program product for implementing backup history cleanup operations for a database management system are provided. The method includes identifying a version control base (VCB) value for a most recently stored record in a history table, the record representing a back up copy of a data set. The method includes scanning the table starting from most recently stored records to identify records that represent previous backup copies of the data set, the records assigned VCB values. Using a retention limit value assigned to each of the VCBs, the method includes selecting at least one record to determine the deletion date for use in implementing the cleanup operations. The selection includes counting the number of records, representing back up copies of the data set, for each VCB value; identifying last records for respective VCBs that do not exceed the retention limit value; selecting the oldest storage date among the last records; and deleting records that have storage dates older than the oldest storage date.

18 Claims, 3 Drawing Sheets

300

| Time | History table records | counter behavior VCB_1 | counter behavior VCB_2 | counter behavior VCB_3 |
|---|---|---|---|---|
| t16 (today) | vcb_1 (full,lp) | 1 | | |
| t15 | vcb_1 (incr,lp) | 2 | | |
| t14 | vcb_3 (incr,lp) | | | 1 |
| t13 | none_vcb | | | |
| t12 | vcb_2 (full,lp) | | 1 | |
| t11 | vcb_1 (full,lp) | 3 | | |
| t10 | vcb_3 (incr,lp) | | | 2 |
| t9 | vcb_2 (full,lp) | | 2 | |
| t8 | vcb_1 (full,1b) | | | |
| t7 | vcb_3 (incr,lp) | | | 3 |
| t6 | vcb_1 (full,lp) | | | |
| t5 | none_vcb | | | |
| t4 | vcb_2 (full,lp) | | 3 | |
| t3 | vcb_2 (full,lp) | | | |
| t2 | vcb_1 (incr,lp) | | | |
| t1 | vcb_3 (incr,lp) | | | |
| t0 (past) | none_vcb | | | |

FIG. 3

METHOD, SYSTEM, AND COMPUTER PROGRAM PRODUCT FOR IMPLEMENTING BACK UP HISTORY CLEANUP OPERATIONS FOR A DATABASE MANAGEMENT SYSTEM

BACKGROUND

The present disclosure relates generally to database management systems and, in particular, to a method, system, and computer program product for implementing back up history cleanup operations for a database management system that supports version control of back up copies.

Database management systems perform a variety of tasks including tracking back up copies of data sets (e.g., table space or index space). Typically, the copies are tracked in some type of history table. For example, IBM®'s DB2 for z/OS database server uses a database table called SYSIBM.SYSCOPY to record the performed copies. The term "copy" refers to the backup of the table space or index space. Each row in the history table represents a copy. A typical database management application can have thousands of table spaces and, as a result, the history table contains many rows. Based upon the back up and history cleanup strategy in place, a certain number of copies per table space or index space are retained.

For operating systems that support versioning control (e.g., IBM z/OS data set type called "Generation Data Group" or "GDG"), it is possible to define the amount of versions per data set. If the number of versions is reached, the creation of a new version leads to the deletion of the oldest version, thereby ensuring that the number of versions will not be exceeded.

This mechanism works well for performing database management system copies in that only the defined number of copies will physically be stored on a disk. However, this does not affect the contents of the history table. In order to synchronize the history table to accurately reflect the copies physically stored on disk, some database management systems include a utility especially designed to perform housekeeping on the history file. For example, IBM® DB2 uses a utility called MODIFY RECOVERY to enable an administrator to delete rows that are no longer needed in the history table. MODIFY RECOVERY also supports several options to define the scope of the deletion. One option is GDGLIMIT, which queries the operating system for the definition of the GDG and cleans up the history table (e.g., SYSIBM.SYSCOPY) accordingly. Other options of MODIFY RECOVERY include AGE and DATE. AGE specifies the number of days to retain records in the history file. The option DATE may be used to delete all records in the history file that are older than a specified date.

Cleanup operations that utilize a version control limit (e.g., GDGLIMIT) are able to retain a certain number of records in the history file. In general, the processes involved consider history records only if they were made to a particular destination type (e.g., local primary) and are of a certain back up type (e.g., full image copy). Thus, in the above example, the version control limit applies only if the most recent full image copy with a destination type of local primary is a copy to a specified version control base (e.g., back up time intervals). In this instance, the version control limit is retrieved and the history table is scanned until the version control limit is reached. The date of the oldest version is used as the deletion date and all records in the history file that are older than this deletion date are deleted. Records are counted only if they belong to the version control base of the most recent record. Copies to different version control bases are skipped, as well as incremental copies. As a result, problems with recovery operations arise if more than one version control base is used for copies of the same table space. A version control base may be defined as a time interval used in specifying when a back up is to be performed (e.g., daily, weekly, monthly).

Some known causes of ineffective cleanup operations include situations in which copies of a table space have different version control bases (e.g., monthly with a version control limit of 12 and daily with a version control limit of 30), a failure to differentiate between copies at different locations (e.g., local and recovery site copy), and copies triggered for different reasons (e.g., manually entered by an administrator or automatically by a tool).

In these cases, the results of the cleanup operations may be unpredictable and depend upon which version control base was last to be used in the cleanup process. As a result, this may lead to deletion of records for copies that still exist in storage.

What is needed, therefore, is a way to implement backup history cleanup operations that factor in elements, such as version control bases, location of copies, and type of back up involved.

SUMMARY

Embodiments of the invention include a method for implementing backup history cleanup operations for a database management system. The method includes identifying a version control base (VCB) value for a most recently stored record in a history table, the record representing a back up copy of a data set. The method includes scanning the history table starting from most recently stored records to identify records that represent previous backup copies of the data set, the records assigned VCB values. Using a retention limit value assigned to each of the VCBs, the method includes selecting at least one record to determine the deletion date for use in implementing the cleanup operations. The selection includes counting the number of records, representing back up copies of the data set, for each VCB value; identifying last records for respective VCBs that do not exceed the retention limit value; selecting the oldest storage date among the last records; and deleting records that have storage dates older than the oldest storage date.

Additional embodiments include a system for implementing backup history cleanup operations for a database management system. The system includes a host system and a cleanup utility executing on the host system. The cleanup utility implements a method. The method includes identifying a version control base (VCB) value for a most recently stored record in a history table, the record representing a back up copy of a data set. The method includes scanning the history table starting from most recently stored records to identify records that represent previous backup copies of the data set, the records assigned VCB values. Using a retention limit value assigned to each of the VCBs, the method includes selecting at least one record to determine the deletion date for use in implementing the cleanup operations. The selection includes counting the number of records, representing back up copies of the data set, for each VCB value; identifying last records for respective VCBs that do not exceed the retention limit value; selecting the oldest storage date among the last records; and deleting records that have storage dates older than the oldest storage date.

Further embodiments include a computer program product for implementing backup history cleanup operations for a database management system. The computer program product includes a computer-readable storage medium having program code executable thereon. The program code causes a computer to implement a method. The method includes identifying a version control base (VCB) value for a most recently stored record in a history table, the record representing a back up copy of a data set. The method includes scanning the history table starting from most recently stored records to identify records that represent previous backup copies of the data set, the records assigned VCB values. Using a retention limit value assigned to each of the VCBs, the method includes selecting at least one record to determine the deletion date for use in implementing the cleanup operations. The selection includes counting the number of records, representing back up copies of the data set, for each VCB value; identifying last records for respective VCBs that do not exceed the retention limit value; selecting the oldest storage date among the last records; and deleting records that have storage dates older than the oldest storage date.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 is a sample history table used in implementing the back up history cleanup operations in an exemplary embodiment.

The detailed description explains the preferred embodiments of the invention, together with advantages and features, by way of example with reference to the drawings.

DETAILED DESCRIPTION

Figure 1:
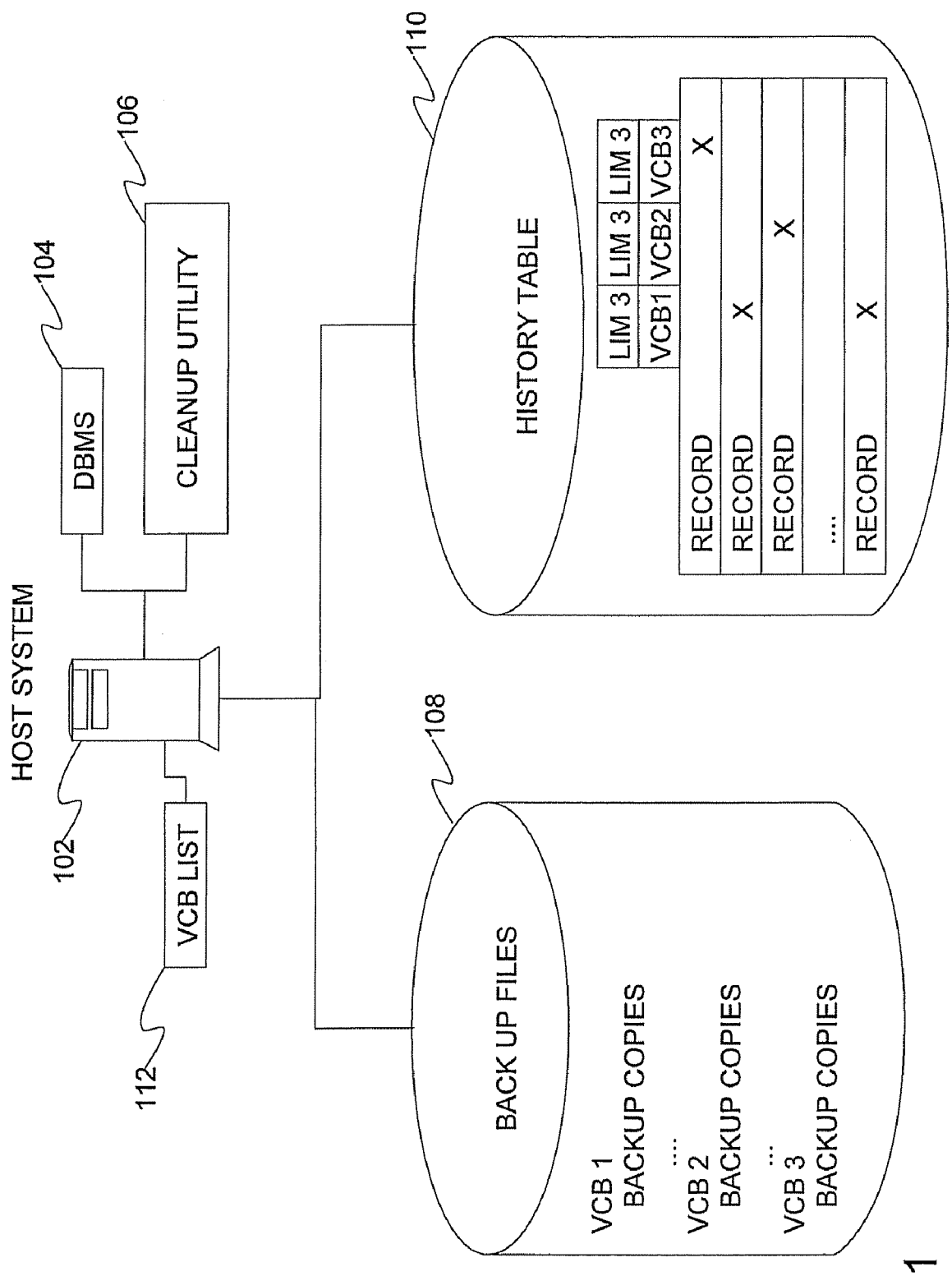
FIG. 1 is a block diagram of a system upon which back up history cleanup operations may be performed in an exemplary embodiment.

In an exemplary embodiment, cleanup operations for a history table (which factor in elements, such as version control bases, location of copies, and type of back up involved) are provided. Turning now to FIG. 1, an exemplary system upon which back up history cleanup operations may be performed will now be described.

The system of FIG. 1 includes a host system 102 executing one or more applications. As shown in FIG. 1, the host system 102 is executing a database management system (DBMS) application 104 and a cleanup utility 106. The host system 102 may be any type of computer processing system, such as a mainframe computer, and executes a suitable operation system, e.g., IBM® z/OS. The database management system performs a variety of tasks, such as tracking back up copies of data sets (e.g., table space or index space) that are processed via the host system 102. In an exemplary embodiment, the copies are tracked in a history table (also referred to herein as "history file").

Also shown in FIG. 1 are storage units 108 and 110. Storage units 108 and 110 may be implemented as memory contained within the host system 102 or may be external storage devices. Alternatively, the information in storage units 108 and 110 may be stored in a distributed manner (e.g., in separate locations and logically addressable by the host system 102).

Storage unit 108 stores back up files (also referred to herein as "copies"). The storage unit 108 may be, e.g., a hard disk drive resident on the host system 102 or otherwise addressable by the host system 102 as indicated above. Storage unit 110 stores the history table. The history table includes records of the back up copies stored in storage unit 108.

In an exemplary embodiment, the database management system supports version control of the back up copies. For example, the database management system 104 may be IBM® DB2. Version control refers to the ability to track different versions of the same table space or index space as part of the back up process. In other words, if a data set, such as a set of bank transactions, is backed up hourly, in ten hours, there would be ten back up copies of the set stored in storage unit 108, each having a different time (e.g., back up timestamp) associated therewith. Various data sets may be backed up in accordance with one or more defined version control bases (VCBs). For example, the above-referenced set of bank transactions may be backed up hourly, as well as daily. Thus, multiple back up copies of the set of bank transactions would be stored in the storage unit 108 based upon a defined interval of time specified for the back up.

As shown in FIG. 1, the history table includes a number of records, each of which represents a back up copy of a data set (e.g., table space or index space). By way of illustration, the records shown in FIG. 1 represent back ups rendered for one table space. A version control base (VCB) may be defined for records associated with each copy, as well as a limit on the number of records (LIM) that may be stored for a given VCB. As shown in FIG. 1, a limit of three has been set for the records for each of VCBs 1-3. In an exemplary embodiment, the system of FIG. 1 provides a counter for each VCB, which is described further in FIGS. 2 and 3.

Also included in the system of FIG. 1 is an in-memory VCB counter list 112 (also referred to herein as "VCB list"). The VCB list 112 stores the VCB limit and counter in the memory of host system 102 during runtime of the cleanup utility 106. The VCB list 112 is empty until utility 106 is initiated and is purged of data when the utility 106 exits or completes its cleanup processes.

In an exemplary embodiment, the cleanup utility 106 enables backup history cleanup operations for a history table, which factors in these version control bases, as well as the location of copies, and the type of back up involved. This will now be described with respect to FIGS. 2 and 3.

Figure 2:
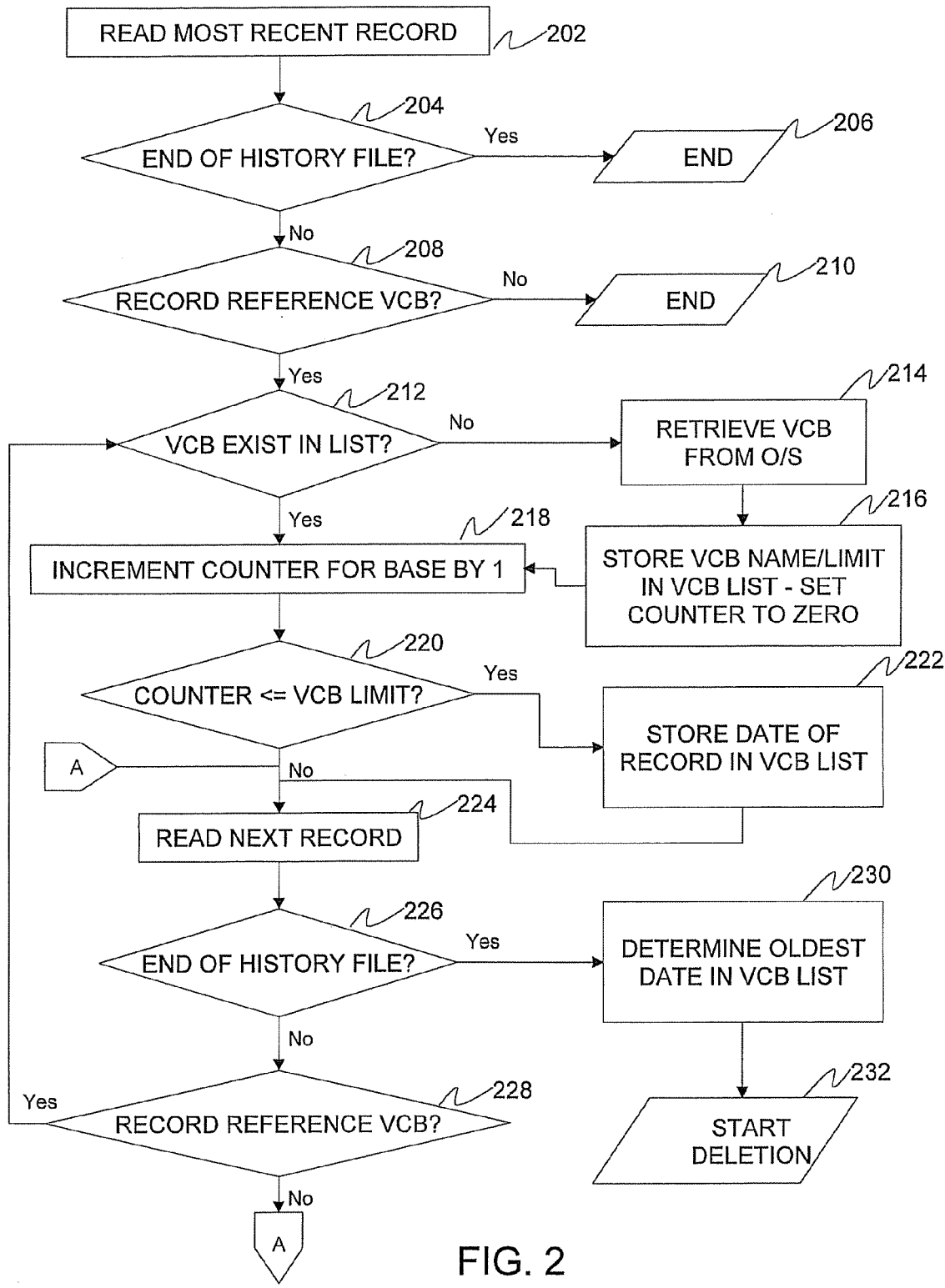
FIG. 2 is a flow diagram describing a process for implementing back up history cleanup operations in an exemplary embodiment.

Turning now to FIG. 2, a process for implementing back up history cleanup operations for the database management system (e.g., DBMS 104) will now be described in an exemplary embodiment.

At step 202, the utility 106 attempts to read the most recent record in the history table. If it is determined that no records exist in the history table at step 204, the process ends at step 206. Otherwise, the utility 106 determines if the record references a version control base (e.g., VCB1, VCB2, VCB3, etc.) at step 208. If not, the process ends at step 210, as no cleanup operations are needed for these records. Otherwise, if the record references a VCB at step 208, the utility 106 determines if the VCB referenced in the record already exists in the VCB list 112 stored in memory at step 212. If not, the VCB associated with the record is retrieved from the operating system of the host system 102 at step 214 and stored in the VCB list 112 in memory at step 216. A counter for the VCB is set to zero and the process proceeds to step 218.

At step 212, if the VCB exists in the list 112 (e.g., one of VCB1, VCB2, VCB3), the counter for the VCB is incremented by one at step 218. At step 220, it is determined whether the counter value is less than or equal to the VCB limit. The VCB limit is a retention limit value assigned to records associated with the VCB and specifies the maximum number of records that may be retained for a table space/index space, which has a corresponding back up copy stored in storage unit 108. If the counter value is less than or equal to the VCB limit, the date of the record is stored in VCB list 112 at step 222. This date represents the date of the record for which the VCB limit has been reached. For each VCB, there is a deletion date established as will be described herein. Once the deletion date has been stored, the process proceeds to step 224.

If the counter is greater than the VCB limit at step 220, the utility 106 continues the scan of the history table and attempts to read the next record at step 224. If there are records remaining in the history table at step 226, it is determined if the record references a VCB at step 228. If not, the process returns to step 224. Otherwise, the process returns to step 212.

Turning back to step 226, if there are no more records remaining in the history table, the utility 106 determines the oldest deletion date established among the VCBs in the VCB list 112 at step 230 and begins the process of deleting records older than this oldest date at step 232.

As shown in FIG. 3, a detailed history table illustrates three VCBs (VCB_1, VCB_2, and VCB_3). Each row in the table represents a record, which in turn, represents a back up copy. As shown in FIG. 3, the records may be associated with full image copy or incremental back ups (full, incr, respectively), and may be backed up to local primary or local backup destinations (lp, lb, respectively). Also, a time designator is shown for each record, symbolized as 't' followed by a number whereby t16 represents the most recent record and t0 represents the oldest record (the record stored for the longest period of time). FIG. 3 also shows the behavior of the counter representing each of the VCBs. As can be seen in the history table of FIG. 3, VCB_1 counter reaches its VCB limit of three at t11. VCB_2 counter reaches its limit of three at t4, and VCB_3 counter reaches its limit of three at t7. As the oldest record among the three VCBs has been stored at t4, all records older than t4 for each VCB will be deleted from the history table. Note that the counter does not discriminate against the records based upon the type of back up (full, incremental) or destination (local primary, local backup, recovery primary, recovery backup) or by version control base (VCB_1-VCB_3).

The history table 300 of FIG. 3 illustrates sample data relating to records stored for three VCBs (VCB_1, VCB_2, and VCB_3). As shown in FIG. 3, during the scan from t16 to t0, the utility 106 determines the most recent record (t16) is a VCB and therefore the VCB limit applies. The counter for VCB_1 is initialized to one. The record for t15 belongs to VCB_1, so the counter for VCB_1 is increased to two. The record for t14 has a different VCB base and therefore a new counter for VCB_3 is initialized to one. The record for t13 is an image copy to a non-VCB data set and is skipped. The record for t12 has a different VCB base and therefore a new counter for VCB_2 is initialized to one. The record for t11 belongs to VCB_1 and the counter is increased to three. Thus, the counter limit for VCB_1 has been reached. The deletion date for VCB_1 is set to t11. The history table scan continues. The record for t10 belongs to VCB_3 and the counter for VCB_3 is increased to two. The record for t9 belongs to VCB_2 and the counter for VCB_2 is increased to two. The record for t8 belongs to VCB_1. The VCB limit for VCB_1 has already been reached and so the record for t8 is skipped. The record for t7 belongs to VCB_3 and the counter for VCB_3 is increased to three. The counter value for VCB_3 has reached three, which is the value of the VCB limit. Thus, the deletion date for VCB_2 is set to t7. VCB records having incremental copies only will also be considered, because the associated full image copy could have been done to a non-VCB data set or to a different VCB. The history table scan continues. The record for t6 is treated the same as the record for t8. The record for t5 is treated the same as the record for t13. The record for t4 belongs to VCB_2 and the counter for VCB_2 is increased to three. The counter value of three for VCB_2 indicates the VCB limit has been reached. The deletion date for VCB_2 is set to t4. The history table scan continues. The record of t3 belongs to VCB_2. The VCB limit for VCB_2 has already been reached and so the record for t3 is skipped. The record for t2 is treated the same as the record for t8. The record for t1 belongs to VCB_3. The VCB limit for VCB_3 has already been reached and so the record for t1 is skipped. The record for t0 is treated the same as the record for t13. After reaching the end of history table, the oldest of all deletion dates will be taken as the deletion date. In this case, it is the deletion date t4 of VCB_2. Thus, all history table records of this table space or index space older than t4 will be deleted.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing back up history cleanup operations for a database management system that supports version control, comprising:
    identifying a version control base value for a most recently stored record in a history table, the record representing a back up copy of a data set;
    scanning the history table starting from most recently stored records to identify records that represent previous back up copies of the data set, the records assigned version control base values; and
    using a retention limit value assigned to each of the version control bases, selecting at least one record to determine the deletion date from the history table for use in implementing the cleanup operations, comprising:
    counting the number of records, representing back up copies of the data set, for each version control base value;
    identifying last records for respective version control bases that do not exceed the retention limit value;
    selecting the oldest storage date among the last records; and
    deleting records that have storage dates older than the oldest storage date.

2. The method of claim 1, wherein the version control base specifies a value indicative of a back up schedule.

3. The method of claim 1, wherein scanning the history table starting from most recently stored records to identify records that represent previous back up copies of the data set includes scanning records specifying varying back up types.

4. The method of claim 3, wherein the back up types include:
    full image copies; and
    incremental back ups.

5. The method of claim 1, wherein scanning the history table starting from most recently stored records to identify records that represent previous back up copies of the data set includes scanning records specifying varying back up destinations.

6. The method of claim 5, wherein the back up destinations include local primary, local backup, recovery primary, recovery backup.

7. A system for implementing back up history cleanup operations for a database management system that supports version control, comprising:
    a host system; and
    a back up history cleanup utility executing on the host system, the back up history cleanup utility implementing a method, comprising:
    identifying a version control base value for a most recently stored record in a history table, the record representing a back up copy of a data set;
    scanning the history table starting from most recently stored records to identify records that represent previous back up copies of the data set, the records assigned version control base values; and
    using a retention limit value assigned to each of the version control bases, selecting at least one record to determine the deletion date from the history table for use in implementing the cleanup operations, comprising:
    counting the number of records, representing back up copies of the data set, for each version control base value;
    identifying last records for respective version control bases that do not exceed the retention limit value;
    selecting the oldest storage date among the last records; and
    deleting records that have storage dates older than the oldest storage date.

8. The system of claim 7, wherein the version control base specifies a value indicative of a back up schedule.

9. The system of claim 7, wherein scanning the history table starting from most recently stored records to identify records that represent previous back up copies of the data set includes scanning records specifying varying back up types.

10. The system of claim 9, wherein the back up types include:
    full image copies; and
    incremental back ups.

11. The system of claim 7, wherein scanning the history table starting from most recently stored records to identify records that represent previous back up copies of the data set includes scanning records specifying varying back up destinations.

12. The system of claim 11, wherein the back up destinations include local primary, local backup, recovery primary, recovery backup.

13. A computer program product for implementing back up history cleanup operations for a database management system that supports version control, the computer program product including a computer-readable storage medium encoded with computer-readable program code, the program code causing a computer to implement a method, comprising:
    identifying a version control base value for a most recently stored record in a history table, the record representing a back up copy of a data set;
    scanning the history table starting from most recently stored records to identify records that represent previous back up copies of the data set, the records assigned version control base values; and
    using a retention limit value assigned to each of the version control bases, selecting at least one record to determine the deletion date from the history table for use in implementing the cleanup operations, comprising:
    counting the number of records, representing back up copies of the data set, for each version control base value;
    identifying last records for respective version control bases that do not exceed the retention limit value;
    selecting the oldest storage date among the last records; and
    deleting records that have storage dates older than the oldest storage date.

14. The computer program product of claim 13, wherein the version control base specifies a value indicative of a back up schedule.

15. The computer program product of claim 13, wherein scanning the history table starting from most recently stored records to identify records that represent previous back up copies of the data set includes scanning records specifying varying back up types.

16. The computer program product of claim 15, wherein the back up types include:
    full image copies; and
    incremental back ups.

17. The computer program product of claim 13, wherein scanning the history table starting from most recently stored records to identify records that represent previous back up copies of the data set includes scanning records specifying varying back up destinations.

18. The computer program product of claim 17, wherein the back up destinations include local primary, local backup, recovery primary, recovery backup.

* * * * *